W. E. LEE.
Seed-Separators.

No. 155,874. Patented Oct. 13, 1874.

WITNESSES:
E. Wolff
A. F. Terry

INVENTOR:
W. E. Lee
BY Munn & Co.
ATTORNEYS.

UNITED STATES PATENT OFFICE.

WILLIAM E. LEE, OF SWAN RIVER, MINNESOTA.

IMPROVEMENT IN SEED-SEPARATORS.

Specification forming part of Letters Patent No. 155,874, dated October 13, 1874; application filed August 15, 1874.

*To all whom it may concern:*

Be it known that I, WILLIAM E. LEE, of Swan River, in the county of Morrison and State of Minnesota, have invented a new and Improved Wheat-Cleaning Machine, of which the following is a specification:

My invention consists of a machine for separating cockle from wheat, comprising a sheet-metal cylinder perforated with holes just large enough to receive the cockle, but too small for the wheat, with a skin belt as wide as the length of the cylinder surrounding it, so as to cause the perforations to retain the cockle, and carry it up and throw it onto a descending shaking trough, hanging in the cylinder above the wheat, to chute the cockle out at one end; and above the cylinder, where it is not covered by the belt, a revolving brush is arranged to brush back onto the chute any grain that may stick in the perforations, and the chute has a brush at one edge to brush down the wheat and leave the cockle in the hole.

Figure 1:
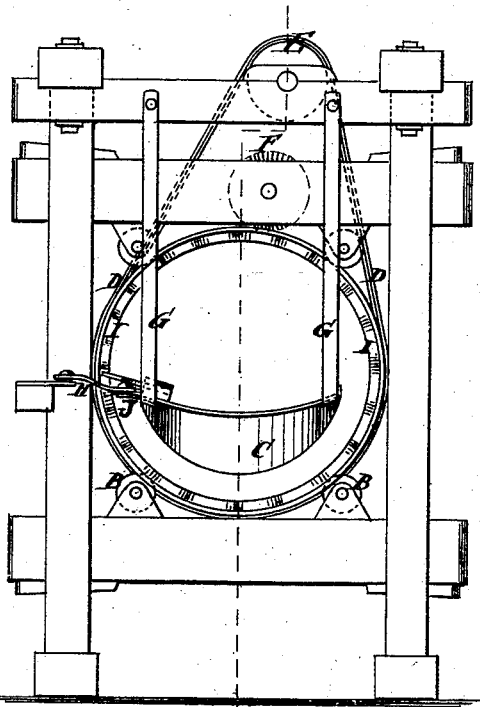
Figure 3:
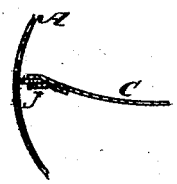
Figure 2:
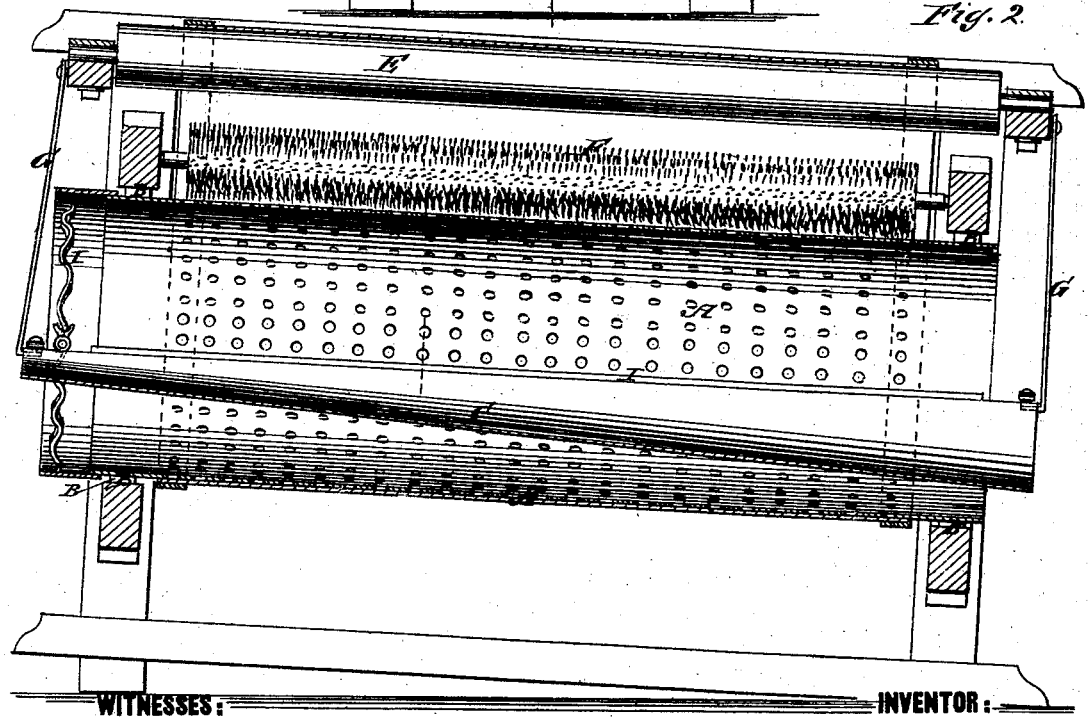

Figure 1 is an end elevation of my improved machine. Fig. 2 is a longitudinal sectional elevation taken on line $x\ x$ of Fig. 1. Fig. 3 is a detail, showing the brush on the chute for brushing down the wheat.

Similar letters of reference indicate corresponding parts.

A represents the perforated sheet-metal cylinder. It is contrived without a central shaft, and mounted on the rollers B at the ends, so as to leave the interior space free for introducing the trough or chute C. The perforations are intended to be just about the size and shape to receive the cockle and not the wheat, and the cylinder is a little inclined from one end to the other, for the wheat discharged into one end to pass gradually along to the other as the cylinder is revolved. D is the wide skin belt, drawn tightly under the cylinder, and over the roller E, a little above the top, so as to retain the cockle in the perforations, and cause them to rise up and fall onto the spout; and in the space under the belt, at the top of the perforated cylinder, is a revolving brush, F, which brushes any grain that that may stick in the perforations out into the spout. The spout is suspended by metal strips G, and connected to the frame by links H, so as to vibrate freely lengthwise, and it is shaken forward and backward by the cams I in the ends of the cylinders to cause the cockle to slide along the spout out of the machine. J is the brush in the edge of the spout, on the rising side of the cylinder, to brush down the wheat, and prevent it from being carried up and thrown onto the spout.

Having thus described my invention, I claim as new and desire to secure by Letters Patent—

1. The combination of the perforated revolving cylinder A, belt D, and shaking trough C, substantially as specified.

2. The combination of the brush F with the perforated cylinder A, belt D, and trough C, substantially as specified.

3. The brush J, in combination with the perforated cylinder A and trough C, substantially as specified.

WILLIAM E. LEE.

Witnesses:
MILO PORTER,
RICHARD L. TRASK.